(12) United States Patent
Tachibana et al.

(10) Patent No.: US 6,805,953 B2
(45) Date of Patent: Oct. 19, 2004

(54) WATERSTOP SEALING MATERIAL (75) Inventors: Katsuhiko Tachibana, Osaka (JP);
Masahiko Ando, Osaka (JP); Yasuyuki Tokunaga, Ibaraki (JP); Manabu Matsunaga, Osaka (JP); Atsushi Kuriu, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/500,446

(22) Filed: Feb. 9, 2000

(65) Prior Publication Data

US 2003/0143389 A1 Jul. 31, 2003

(51) Int. Cl.$^7$ ............................................. B32B 27/36
(52) U.S. Cl. ............... 428/353; 428/354; 428/355 BL; 428/355 AC; 428/412
(58) Field of Search ................................. 428/353, 354, 428/355 BL, 355 AC, 412, 304.4, 314.4, 317.1, 317.3, 317.7, 351

(56) References Cited

U.S. PATENT DOCUMENTS 3,943,678 A * 3/1976 Ehrenberg et al. ............ 52/461
5,476,712 A * 12/1995 Hartman et al. .......... 428/317.3
6,284,360 B1 * 9/2001 Johnson et al. ........... 428/308.8

FOREIGN PATENT DOCUMENTS

EP 0 816 462 A1 1/1998 .......... C09J/167/02

* cited by examiner

Primary Examiner—James J. Seidleck
Assistant Examiner—Melanie Bissett
(74) Attorney, Agent, or Firm—Sughrue Mion, PLLC

(57) ABSTRACT

In accordance with the present invention, a foamed structure having closed cells or both closed cells and open cells can be effectively used as a waterstop sealing material. In particular, a waterstop sealing material having excellent sealing properties can be provided. The waterstop sealing material comprises a foamed structure having closed cells or both closed cells and open cells, the foamed structure having a multi-layer pressure-sensitive adhesive layer provided on at least one side thereof, optionally through a base material, the multi-layer pressure-sensitive adhesive layer comprising as an outermost layer a layer made of a pressure-sensitive adhesive composition containing a polymer having a polycarbonate structure having a repeating unit represented by formula:

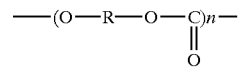

wherein R represents a $C_{2-20}$ straight-chain or branched hydrocarbon group and n represents a positive integer.

5 Claims, 3 Drawing Sheets

WATERSTOP SEALING MATERIAL

FIELD OF THE INVENTION

The present invention relates to a waterstop sealing material comprising a foamed structure having closed cells or both closed cells and open cells.

BACKGROUND OF THE INVENTION

A rubber foamed product has excellent cushioning properties and thus can be used as a cushioning material, padding material or the like. The comparison of closed cells and open cells in a foamed structure shows that the former is a structure having cells defined by a steric lattice as a partition and the latter is a structure having cells free of partition. The latter structure can be easily deformed dynamically. However, the open cell type foamed structure cannot be expected to have waterstop action while the closed cell type foamed structure can be expected to have waterstop action because of repulsive power developed by the partition between cells.

A foamed structure having both closed cells and open cells (hereinafter occasionally referred to as "semi-closed and semi-open foamed structure") can be expected to have both ease in filling complex voids developed by the high deformability based on open cells and good waterstop properties based on closed cells. Thus, such a foamed structure can be used as a waterstop sealing material having complex voids which are filled before use.

However, the foregoing closed foamed structures or semi-closed and semi-open foamed structures are disadvantageous in that when used as waterstop sealing material, they are liable to show a relaxed repulsive power as foamed structure with time, lowering the contact pressure between the surface of the foamed structure and the surface of the adherend and hence causing water leakage along the interface. Thus, these foamed structures occasionally cannot act to stop water. In order to solve these problems, an approach has been proposed involving the provision of a pressure-sensitive adhesive layer on both sides of the foamed structure allowing sealing of the interface of the adherend. However, when a general acrylic or rubber pressure-sensitive adhesive is used as a pressure-sensitive adhesive layer, it exhibits adhesion at the same time with mounting, making it difficult for the waterstop sealing material to be repositioned and hence causing troubles in sealing operation.

JP-A-10-77463 (The term "JP-A" as used herein means an "unexamined published Japanese patent application") discloses that when a pressure-sensitive adhesive layer mainly composed of a polymer having a polycarbonate structure is used as a pressure-sensitive adhesive layer to be provided on the closed foamed structure or semi-closed or semi-open foamed structure, the resulting waterstop sealing material is not immediately bonded to the adherend because the pressure-sensitive adhesive layer is tack-free, can be easily repositioned and mounted without any trouble and then can be gradually bonded to the adherend by the repulsive power of the foamed structure to give drastically enhanced sealing properties between the surface of the foamed structure and the interface of the position to be processed.

However, even the foregoing waterstop sealing material causes deterioration in sealing properties during use under severe conditions, i.e., high temperature over an extended period of time.

SUMMARY OF THE INVENTION

It is therefore an object of the present invention to further improve the foregoing proposed waterstop sealing material and hence provide a shaped waterstop sealing material (namely, a solid and non-flowable sealing material unlike a caulking compound) having further improvements in sealing properties.

The inventors made extensive studies of the foregoing object. As a result, it was found that when used under severe conditions, i.e., high temperature over an extended period of time, waterstop sealing materials are liable to the migration of certain components in some foamed structures to the pressure-sensitive adhesive layer mainly composed of a polymer having a polycarbonate stricture, thereby causing the deterioration of the foregoing pressure-sensitive adhesive layer and lowering of the adhesion and resulting in the deterioration of the sealing properties of the waterstop sealing materials.

Furthermore, it was found that when the specific pressure-sensitive adhesive layer mainly composed of a polymer having a polycarbonate structure is provided on the foamed structure through another pressure-sensitive adhesive layer made of rubber or acrylic pressure-sensitive adhesive or a base material interposed between the specific pressure-sensitive adhesive layer and the foamed structure as a subbing layer, the tack-freeness of the upper pressure-sensitive adhesive layer makes it possible to improve the sealing operation such as mounting. Further, the subbing pressure-sensitive adhesive layer or base material prevents the migration of components from the foamed structure, making it possible to avoid the deterioration of the upper pressure-sensitive adhesive layer. Even when the foregoing components migrate to the subbing pressure-sensitive adhesive layer, there arises little or no disadvantages such as deterioration. Eventually, this arrangement exhibits further enhancement of sealing properties as compared with those comprising an upper pressure-sensitive adhesive layer alone. In particular, this arrangement provides excellent sealing properties under severe conditions, i.e., high temperature over an extended period of time.

The present invention provides a waterstop sealing material comprising a foamed structure having closed cells or both closed cells and open cells, the foamed structure having a multi-layer pressure-sensitive adhesive layer provided on at least one side thereof, the multi-layer pressure-sensitive adhesive layer comprising as an outermost layer a layer made of a pressure-sensitive adhesive composition containing a polymer having a polycarbonate structure having a repeating unit represented by the following general formula:

wherein R represents a $C_{2-20}$ straight-chain or branched hydrocarbon group and n represents a positive integer. The present invention further concerns a waterstop sealing material having the foregoing structure, wherein the foamed structure has a multi-layer pressure-sensitive adhesive layer provided on at least one side thereof, the multi-layer pressure-sensitive adhesive layer comprising as an outermost layer a layer made of a pressure-sensitive adhesive composition containing a polymer having a polycarbonate structure, and a pressure-sensitive adhesive layer made of a pressure-sensitive adhesive composition different from the pressure-sensitive adhesive composition provided on the other side thereof.

The present invention further provides a waterstop sealing material comprising a foamed structure having closed cells or both closed cells and open cells, the foamed structure having a layer made of a pressure-sensitive adhesive composition containing a polymer having a polycarbonate structure having a repeating unit represented by the following general formula provided on at least one side thereof with a base material interposed therebetween:

wherein R represents a $C_{2-20}$ straight-chain or branched hydrocarbon group and n represents a positive integer. The present invention further concerns a waterstop sealing material having the foregoing structure, wherein the foamed structure has a layer made of a pressure-sensitive adhesive composition containing a polymer having a polycarbonate structure provided on one side thereof with a base material interposed therebetween and a pressure-sensitive adhesive layer made of a pressure-sensitive adhesive composition different from the pressure-sensitive adhesive composition provided on the other side thereof.

BRIEF DESCRIPTION OF THE DRAWINGS

By way of example and to make the description more clear, reference is made to the accompanying drawings in which.

DETAILED DESCRPTION OF THE INVENTION

In the present invention, the outermost layer of the multi-layer pressure-sensitive adhesive layer or the pressure-sensitive adhesive layer provided with the interposition of a base material is made of a pressure-sensitive adhesive composition containing a polymer having a polycarbonate structure having a repeating unit represented by the following general formula:

wherein R represents a $C_{2-20}$ straight-chain or branched hydrocarbon group and n represents a positive integer, generally an integer of from 2 to 50. The molecular weight of the polymer having the foregoing polycarbonate structure is generally 10,000 or more, preferably 30,000 or more, more preferably 50,000 or more (normally up to 300,000) as calculated in terms of weight-average.

Examples of the foregoing polymer include polyester synthesized from polycarbonate diol (or derivative thereof) and dicarboxylic acid, polyester synthesized from polycarbonatedicarboxylic acid and diol, and polyurethane synthesized from polycarbonate diol and diisocyanate. Particularly preferred among these polymers is polyester synthesized from polycarbonate diol and dicarboxylic acid.

The foregoing polyester can be obtained by the esterification reaction of a diol component comprising as an essential component a polycarbonate diol with a dicarboxylic acid component comprising as an essential component a dicarboxylic acid having a $C_{2-20}$ aliphatic or alicyclic hydrocarbon group as a molecular skeleton in the absence or presence of a proper catalyst according to ordinary method. For this reaction, the diol component and the dicarboxylic acid component are preferably reacted in equimolecular amounts so that the resulting polyester has a molecular weight falling within the foregoing range. Alternatively, one of the two components may be used in excess at the equivalent point to accelerate the esterification reaction.

The polycarbonate diol used herein is a diol having a repeating unit represented by the following general formula:

wherein R represents a $C_{2-20}$ straight-chain or branched hydrocarbon group and n represents a positive integer, generally an integer of from 2 to 50. The number-average molecular weight of the foregoing polycarbonate diol is preferably 400 or more, preferably 900 or more (normally up to 10,000). Specific examples of the polyolefin diol employable herein include polyhexamethylene carbonate diol, poly(3-methylpentene carbonate)diol, polypropylene carbonate diol, and mixture or copolymer thereof. Commercially available examples of the polyolefin diol include PLACCEL CD205PL, CD208PL, CD210PL, CD220PL, CD205HL, CD208HL, CD210HL and CD220HL produced by DAICEL CHEMICAL INDUSTRIES, LTD.

As the diol component there may be optionally used straight-chain or branched diols such as ethylene glycol, propylene glycol, butanediol, hexanediol, octanediol, decanediol and octanediol, in combination. These diols may be used in an amount of not more than 50% by weight, preferably not more than 30% by weight based on the total amount of diol components. In order to obtain a polymer having a high molecular weight, a small amount of trifunctional or higher polyol components may be incorporated therein.

The dicarboxylic acid component comprises a $C_{2-20}$ aliphatic or alicyclic hydrocarbon group as a molecular skeleton. The foregoing hydrocarbon group may be straight-chain or branched. Specific examples of such a dicarboxylic acid component include succinic acid, methylsuccinic acid, adipic acid, pimelic acid, azelaic acid, sebacic acid, 1,12-dodecanedioic acid, 1,14-tetradecanedioic acid, tetrahydrophthalic acid, endomethylenetetrahydrophthalic acid, and anhydride or lower alkyl ester thereof.

In the present invention, the polymer having such a polycarbonate structure as the foregoing polyester can be crosslinked by a proper method to obtain a tack-free pressure-sensitive adhesive composition excellent in durability such as heat resistance. The crosslinking method may be arbitrary. In practice, however, a method is preferably employed involving the addition of a so-called crosslinking agent which is a compound containing a functional group reactive with the hydroxyl group and/or carboxyl group contained in the polymer such as polyester. Examples of the crosslinking agent employable herein include polyisocyanate compound, epoxy compound, aziridine compound, metal chelate compound, and metal alkoxide compound. Particularly preferred among these crosslinking agents is a polyisocyanate compound.

Examples of the polyisocyanate compound employable herein include lower aliphatic polyisocyanates such as ethylene diisocyanate, butylene diisocyanate and hexamethylene diisocyanate, alicyclic polyisocyanates such as cyclopentylene diisocyanate, cyclohexylene diisocyanate and isophorone diisocyanate, and aromatic polyisocyanates such as 2,4-tolylene diisocyanate, 4,4'-diphenylmethane diisocyanate and xylylene diisocyanate. Besides these polyisocyanate compounds, tolylene diisocyanate adduct or hexamethylene diisocyanate adduct of trimethylolpropane may be used.

These crosslinking agents may be used singly or in admixture. The amount of these crosslinking agents may be properly predetermined according to the balance with the polymer to be crosslinked such as polyester or the purpose of the pressure-sensitive adhesive composition. In practice, these crosslinking agents can be used generally in a proportion of from 0.5 to 5 parts by weight based on 100 parts by weight of the polymer to be crosslinked such as polyester. When the proportion of these crosslinking agents falls within the above defined range, the adhesion for giving desired sealing properties and the tack-freeness for facilitating mounting can be well balanced.

The foregoing pressure-sensitive adhesive composition provided as the outermost layer or provided with the interposition of a base material may comprise conventional various tackifiers incorporated therein. The incorporation of such a tackifier may make it easy to balance adhesive force and durability. The foregoing pressure-sensitive adhesive composition may also arbitrarily comprise an inorganic or organic filler, a powder such as metal powder and pigment, and various known additives such as particulate matter and foil-like material incorporated therein. The foregoing pressure-sensitive adhesive composition may further comprise an age inhibitor incorporated therein to enhance its durability.

In the present invention, the layer under the pressure-sensitive adhesive layer in the multi-layer structure, i.e., the inner side of the layer made of a pressure-sensitive adhesive composition containing a polymer having the foregoing polycarbonate structure constituting the outermost layer can be composed of various pressure-sensitive adhesives different from the foregoing pressure-sensitive adhesive composition. Examples of such a pressure-sensitive adhesive composition include rubber pressure-sensitive adhesive, acrylic pressure-sensitive adhesive, silicone pressure-sensitive adhesive, urethane pressure-sensitive adhesive, vinyl alkyl ether pressure-sensitive adhesive, polyvinyl alcohol pressure-sensitive adhesive, polyvinyl pyrrolidone pressure-sensitive adhesive, polyacrylamide pressure-sensitive adhesive, and cellulose pressure-sensitive adhesive. The subbing pressure-sensitive adhesive layer is intended to hold the foregoing outermost layer and inhibit the deterioration thereof. From this standpoint of view, rubber pressure-sensitive adhesive or acrylic pressure-sensitive adhesive is preferred. In particular, acrylic pressure-sensitive adhesive, which has an excellent durability, is preferred.

The rubber pressure-sensitive adhesive comprises a rubber polymer such as natural rubber, polyisoprene rubber, styrene-isoprene-styrene block copolymer rubber, styrene-butadiene-styrene block copolymer rubber, regenerated rubber, styrene-butadiene copolymer rubber, polyisobutylene and acrylonitrile-butadiene copolymer rubber (NBR) as a base polymer. A rubber pressure-sensitive adhesive the cohesive force of which has been properly adjusted by crosslinking process such as thiuram vulcanization and phenolic resin vulcanization is preferably used.

The acrylic pressure-sensitive adhesive comprises as a base polymer an acrylic polymer obtained by the radical polymerization of a (meth) acrylic acid alkyl ester containing $C_{4-18}$ alkyl group and optionally other unsaturated monomers copolymerizable therewith. The foregoing (meth) acrylic acid alkyl ester is an alkyl ester of (meth) acrylic acid containing $C_{4-18}$ alkyl group such as n-butyl, t-butyl, amyl, 2-ethylhexyl, octyl, nonyl, decyl, lauryl and stearyl. When the number of carbon atoms in the alkyl group falls outside the above defined range, the resulting pressure-sensitive adhesive is liable to have an impaired pressure-sensitive adhesion.

Examples of the copolymerizable unsaturated monomers include unsaturated carboxylic acids such as (meth) acrylic acid, (anhydrous) maleic acid, itaconic acid, fumaric acid and crotonic acid, (meth)acrylic acid-based esters having functional organic group such as hydroxyethyl, hydroxypropyl, or glycidyl group, (meth)acrylic acid alkyl ester containing alkyl group having carbon atoms in an amount falling outside the above defined range, vinyl esters such as vinyl acetate and vinyl propionate, styrene derivatives such as styrene and α-methylstyrene, vinyl pyrrolidone, (meth)acrylonitrile, (meth)acrylamide and N-methylol (meth)acrylamide. The amount of the copolymerizable unsaturated monomer to be used is preferably not more than 20 parts by weight for unsaturated carboxylic acids and not more than 50 parts by weight for other unsaturated monomers based on 100 parts by weight of (meth)acrylic acid alkyl ester containing $C_{4-18}$ alkyl group as a main monomer.

As the acrylic pressure-sensitive adhesive there can be preferably used one having an improved adhesion obtained by crosslinking the foregoing acrylic polymer. Examples of the crosslinking treatment include a process involving the copolymerization with a polyfunctional unsaturated monomer such as ethylene glycol di(meth)acrylate, pentaerythritol di(meth)acrylate and trimethylyolpropane tri(meth) acrylate to effect internal crosslinking, a process involving the incorporation of a crosslinking agent such as isocyanate-based compound, epoxy-based compound, peroxide-based compound and chelate-based compound to effect external crosslinking, and a process involving the irradiation with radiations such as electron beam and ultraviolet rays to effect crosslinking.

The pressure-sensitive adhesive for the subbing layer comprising such a rubber pressure-sensitive adhesive and acrylic pressure-sensitive adhesive may optionally comprise various additives commonly incorporated in pressure-sensitive adhesives such as natural or synthetic resin, tackifier, plasticizer, softening agent, filler (e.g., glass fiber, glass beads, metal powder, calcium carbonate, clay, other inorganic powder), pigment, colorant and age inhibitor. Particularly preferred among these additives is tackifier because it is useful in the enhancement of adhesive force.

As the base material to be used in the present invention there can be used any material commonly used as base material for pressure-sensitive adhesive sheets. For example, porous base material such as nonwoven fabric, plastic film, metal foil, etc. may be used. Preferred among these materials are plastic film and metal foil, particularly plastic film, from the standpoint of the prevention of migration of components from the foamed structure. The thickness of the base material may be properly predetermined depending on the base material material. In practice, however, it is preferably from 5 to 100 μm for plastic film.

As the foamed structure to be used in the present invention there can be used any foamed material having closed cells or both closed cells and open cells. The preparation of the foregoing foamed structure can be accomplished by a method which comprises kneading a natural or synthetic rubber such as chloroprene rubber, ethylene-propylene terpolymer (e.g., a terpolymer prepared from ethylene, propylene, and 5-ethylidene-2-norbornene, dicyclopentadiene or 1,4-hexadiene), a vulcanizing agent, a foaming agent and a filler in a kneader such as Banbury mixer and pressure kneader, forming the material into sheet or rod while being continuously kneaded by a calender, extruder, conveyor belt caster or the like, vulcanizing the material, expanding the material, and then optionally cutting the expanded vulcanized product into desired shape or a method which comprises kneading a natural or synthetic rubber, a vulcanizing agent, a foaming agent and a filler over a mixing roll, and then subjecting the composition thus kneaded to batchwise vulcanization, expansion and molding in a mold.

The first waterstop sealing material according to the invention comprises a subbing layer (generally having a thickness of from 2 to 100 μm) made of the foregoing rubber pressure-sensitive adhesive or acrylic pressure-sensitive adhesive provided on the foamed structure and an upper layer (generally having a thickness of from 2 to 100 μm) made of a pressure-sensitive adhesive composition containing a polymer having the foregoing polycarbonate structure provided on the subbing layer. The foregoing subbing layer may consist of two or more layers, giving a multi-layer consisting of three of more layers in all. In other words, any structure may be employed so far as the layer made of the foregoing specific pressure-sensitive adhesive composition is the outermost layer. Further, such a multi-layer pressure-sensitive adhesive layer may be provided not only on one side of the foamed structure but also on both sides of the foamed structure as necessary. The various layers may be directly applied to the foamed structure which is then dried. Alternatively, the various layers may be formed on a release liner from which they are then sequentially laminated on the foamed structure.

The multi-layer pressure-sensitive adhesive layer thus provided can be easily repositioned during mounting and thus has an excellent mountability because the pressure-sensitive adhesive composition constituting the outermost layer is tack-free itself. The multi-layer pressure-sensitive adhesive layer thus mounted is gradually bonded to the adherend by the repulsive power of the foamed structure to enhance the sealing properties of the surface of the foamed structure with respect to the interface of the position to be processed. Further, since the subbing pressure-sensitive adhesive layer can fairly hold the outermost pressure-sensitive adhesive layer and inhibit the deterioration attributable to the migration of components from the foamed structure, the waterstop sealing material of the invention can exhibit high sealing properties over extended period of time under severe conditions such as high temperature.

In the case where the foregoing multi-layer pressure-sensitive adhesive layer is provided on only one side of the foamed structure, a layer made of a general-purpose pressure-sensitive adhesive such as the foregoing rubber pressure-sensitive adhesive and acrylic pressure-sensitive adhesive may be provided on the other side of the foamed structure. In this structure, a release liner may be laminated on the pressure-sensitive adhesive layer. In this arrangement, the waterstop sealing material can be positioned using the multi-layer pressure-sensitive adhesive layer which is tack-free on the outermost layer thereof during mounting. Thereafter, the foregoing release liner can be peeled off from the other side of the foamed structure to seal the position in question.

The second waterstop sealing material of the invention comprises a layer (a thickness of normally from 2 to 100 μm) made of a pressure-sensitive adhesive composition containing a polymer having the foregoing polycarbonate structure provided on the foamed structure through the foregoing base material interposed therebetween. The foregoing pressure-sensitive adhesive composition layer to be provided with the interposition of a base material may be provided not only one side of the foamed structure but also on both sides of the foamed structure as necessary. The foregoing pressure-sensitive adhesive composition layer may be provided by any method. In practice, however, the foregoing pressure-sensitive adhesive composition may be previously applied to a base material to prepare a pressure-sensitive adhesive sheet which is then laminated on the foamed structure with the base material positioned thereinside. The lamination of the pressure-sensitive adhesive sheet can be accomplished with a proper adhesive (or a pressure-sensitive adhesive) or by heat fusion. In the case where an adhesive or a pressure-sensitive adhesive is used in lamination, the adhesive or pressure-sensitive adhesive can be previously applied to the side of the base material opposite to the side having the pressure-sensitive adhesive composition layer of the present invention.

The waterstop sealing material thus formed has a high strength (nerve) and a good punchability as a whole and an excellent handleability during mounting because of the presence of the foregoing base material. Further, since the foregoing pressure-sensitive adhesive composition layer is tack-free and can be easily positioned and repositioned, the waterstop sealing material of the invention has drastically excellent sealing properties. Moreover, the pressure-sensitive adhesive composition layer thus mounted is gradually bonded to the adherend by the repulsive power of the foamed structure to enhance the sealing properties of the surface of the foamed structure with respect to the position to be processed. During this procedure, the base material holds the foregoing pressure-sensitive adhesive composition layer and inhibits the deterioration attributable to the migration of components from the foamed structure. The waterstop sealing material of the invention can exhibit high sealing properties over extended period of time under severe conditions such as high temperature.

In the case where the foregoing multi-layer pressure-sensitive adhesive layer is provided on only one side of the foamed structure, a layer made of a general-purpose pressure-sensitive adhesive such as the foregoing rubber pressure-sensitive adhesive and acrylic pressure-sensitive adhesive may be provided on the other side of the foamed structure as a pressure-sensitive adhesive layer different from the foregoing pressure-sensitive adhesive composition layer. The waterstop sealing material of this type has characteristics inherent to the foregoing general-purpose pressure-sensitive adhesive layer in addition to the foregoing effects.

The present invention will be further described in the following examples, but the present invention should not be construed as being limited thereto. The term "parts" as used hereinafter is meant to indicate "parts by weight".

EXAMPLE 1—1

The foregoing ingredients were kneaded by a mixing roll, heated to a temperature of 160° C. for 30 minutes in an oven so that they were vulcanized and expanded, withdrawn from the oven, allowed to cool, and then compressed so that some of cells were ruptured to obtain a semi-closed and semi-open foamed structure. The resulting foamed structure had a specific gravity of 0.11 g/ml.

Formulation of Foamed Structure

| Ethylene-propylene terpolymer* | 100 parts |
|---|---|
| Zinc oxide | 5 parts |
| Stearic acid | 1 part |
| Carbon | 40 parts |
| Polyethylene | 20 parts |
| Heavy calcium carbonate | 180 parts |
| polybutene | 40 parts |
| Sulfur | 2 parts |
| Mercaptobenzothiazole | 1 part |
| Zinc diethyldithiocarbaminate | 2 parts |
| Azodicarboxylic acid amide | 13 parts |

*a terpolymer prepared from ethylene, propylene and 5-ethylidene-2-norbornene

Separately, 90 parts of 2-ethylhexyl acrylate and 10 parts of acrylic acid were subjected to radical polymerization in the presence of 0.2 parts of azobisisobutyronitrile and 200 parts of toluene at 60° C. for 5 hours to obtain a solution containing an acrylic polymer. To the solution thus obtained was then added a hexamethylenediisocyanate adduct of trimethylolpropane ("Coronate HL", produced by Nippon Polyurethane Industry Co., Ltd.) as a crosslinking agent in an amount of 2 parts based on 100 parts of the acrylic polymer. The mixture was then thoroughly stirred to prepare an acrylic pressure-sensitive adhesive.

Separately, into a four-necked separable flask equipped with an agitator, a temperature indicator and a water-separating tube were charged 500 g of a polycarbonate diol ("PLACCEL CD220PL", produced by DAICEL CHEMICAL INDUSTRIES, LTD.; hydroxyl number: 55.4 KOHmg/g), 50 g of sebacic acid and 123 mg of dibutyltin oxide as a catalyst. In the presence of a small amount of toluene as a solvent for discharging reaction water, the mixture was heated with stirring to a temperature of 180° C. where it was then kept. After a while, water was recognized to have been discharged and separated, showing that reaction began. After about 50 hours of reaction, a polyester having a weight-average molecular weight of 47,000 was obtained. To the polyester were then added a hexamethylenediisocyanate adduct of trimethylolpropane ("Coronate HL", produced by Nippon Polyurethane Industry Co., Ltd.) as a crosslinking agent in an amount of 2 parts (solid content) based on 100 parts (solid content) of the polyester. The mixture was then thoroughly stirred to prepare a polyester-based pressure-sensitive adhesive.

The foregoing semi-closed and semi-open foamed structure, acrylic pressure-sensitive adhesive and polyester-based pressure-sensitive adhesive were then processed according to the following method to prepare a waterstop sealing material. In some detail, the acrylic pressure-sensitive adhesive was directly applied to a release liner by an applicator, and then dried to form two acrylic pressure-sensitive adhesive layers having a thickness of 50 $\mu$m and 150 $\mu$m, respectively. Similarly, the polyester-based pressure-sensitive adhesive was applied to a release liner, and then dried to form a polyester-based pressure-sensitive adhesive layer having a thickness of 30 $\mu$m. Subsequently, the foregoing acrylic pressure-sensitive adhesive layer having a thickness of 50 $\mu$m was applied to one side of the foregoing semi-closed and semi-open foamed structure. The foregoing polyester-based pressure-sensitive adhesive layer was then applied to the acrylic pressure-sensitive adhesive layer to provide a two-layer pressure-sensitive adhesive layer. The foregoing acrylic pressure-sensitive adhesive layer having a thickness of 150 $\mu$m was then applied to the foamed structure on the side thereof opposite the foregoing two-layer pressure-sensitive adhesive layer to prepare a waterstop sealing material.

EXAMPLE 1-2

The same polyester-based pressure-sensitive adhesive as used in Example 1—1 was applied to a release liner, and then dried to obtain a polyester-based pressure-sensitive adhesive layer having a thickness of 5 $\mu$m. A waterstop sealing material was then prepared in the same manner as in Example 1—1 except that the polyester-based pressure-sensitive adhesive layer was used as an upper layer in the two-layer pressure-sensitive adhesive layer structure.

EXAMPLE 1-3

The following ingredients were kneaded by a mixing roll, and then heated to a temperature of 160° C. for 30 minutes in an oven so that they were vulcanized and expanded to obtain a foamed structure having closed cells. The foamed structure had a specific gravity of 0.10 g/ml. Subsequently, a waterstop sealing material was prepared in the same manner as in Example 1—1 except that the foamed structure having closed cells was used instead of the foamed structure having semi-closed and semi-open cells of Example 1—1.

Formulation of Foamed Structure

| Ethylene-propylene terpolymer* | 40 parts |
|---|---|
| Butyl rubber | 60 parts |
| Zinc oxide | 5 parts |
| Stearic acid | 3 parts |
| Carbon | 50 parts |
| Heavy calcium carbonate | 50 parts |
| Process oil | 20 parts |
| Sulfur | 0.5 parts |
| Mercaptobenzothiazole | 1 part |
| Zinc diethyldithiocarbaminate | 1 part |
| Quinone dioxim | 0.5 parts |
| Quinone monoxim | 0.5 parts |
| Azodicarboxylic acid amide | 20 parts |

*a terpolymer prepared from ethylene, propylene and 5-ethylidene-2-norbornene

EXAMPLE 2-1

The following ingredients were kneaded by a mixing roll, heated to a temperature of 160° C. in an oven for 30 minutes so that they were vulcanized and expanded, withdrawn from the oven, allowed to cool, and then compressed so that some of cells were ruptured to obtain a semi-closed and semi-open foamed structure. The foamed structure thus obtained had a specific gravity of 0.11 g/ml.

Formulation of Foamed Structure

| Ethylene-propylene terpolymer* | 100 parts |
|---|---|
| Zinc oxide | 5 parts |
| Stearic acid | 1 part |

-continued

| | |
|---|---|
| Carbon | 40 parts |
| Polyethylene | 20 parts |
| Heavy calcium carbonate | 180 parts |
| Polybutene | 40 parts |
| Sulfur | 2 parts |
| Mercaptobenzothiazole | 1 part |
| Zinc diethyldithiocarbaminate | 2 parts |
| Azodicarboxylic acid amide | 13 parts |

*a terpolymer prepared from ethylene, propylene and 5-ethylidene-2-norbornene

Separately, 90 parts of 2-ethylhexyl acrylate and 10 parts of acrylic acid were subjected to radical polymerization in the presence of 0.2 parts of azobisisobutyronitrile and 200 parts of toluene at 60° C. for 5 hours to obtain a solution containing an acrylic polymer. To the solution thus obtained was then added a hexamethylenediisocyanate adduct of trimethylolpropane ("Coronate HL", produced by Nippon Polyurethane Industry Co., Ltd.) as a crosslinking agent in an amount of 2 parts based on 100 parts of the acrylic polymer. The mixture was then thoroughly stirred to prepare an acrylic pressure-sensitive adhesive.

Separately, into a four-necked separable flask equipped with an agitator, a temperature indicator and a water-separating tube were charged 500 g of a polycarbonate diol ("PL ACCEL CD220PL", produced by DAICEL CHEMICAL INDUSTRIES, LTD.; hydroxyl number: 55.4 KOHmg/g), 50 g of sebacic acid and 123 mg of dibutyltin oxide as a catalyst. In the presence of a small amount of toluene as a solvent for discharging reaction water, the mixture was heated with stirring to a temperature of 180° C. where it was then kept. After a while, water was recognized to have been discharged and separated, showing that reaction began. After about 50 hours of reaction, a polyester having a weight-average molecular weight of 47,000 was obtained. To the polyester were then added a hexamethylenediisocyanate adduct of trimethylolpropane ("Coronate HL", produced by Nippon Polyurethane Industry Co., Ltd.) as a crosslinking agent in an amount of 2 parts (solid content) based on 100 parts (solid content) of the polyester. The mixture was then thoroughly stirred to prepare a polyester-based pressure-sensitive adhesive.

The foregoing semi-closed and semi-open foamed structure, acrylic pressure-sensitive adhesive and polyester-based pressure-sensitive adhesive were then processed according to the following method to prepare a waterstop sealing material. In some detail, the acrylic pressure-sensitive adhesive was directly applied to a release liner by an applicator, and then dried to form two acrylic pressure-sensitive adhesive layers having a thickness of 50 μm and 150 μm, respectively. The above-prepared polyester-based pressure-sensitive adhesive was applied to a release liner with a polyethylene terephthalate film (hereinafter referred to as "PET film") having a thickness of 25 μm as a base material, and then dried to obtain a pressure-sensitive adhesive sheet having a polyester-based pressure-sensitive adhesive layer having a thickness of 30 μm. Subsequently, the foregoing acrylic pressure-sensitive adhesive layer having a thickness of 50 μm was applied to one side of the foregoing semi-closed and semi-open foamed structure. The foregoing pressure-sensitive adhesive sheet was then applied to the acrylic pressure-sensitive adhesive layer with the base material positioned thereinside. The foregoing acrylic pressure-sensitive adhesive layer having a thickness of 150 μm was then applied to the foamed structure on the side thereof opposite the foregoing pressure-sensitive adhesive layer to prepare a waterstop sealing material.

EXAMPLE 2—2

The same polyester-based pressure-sensitive adhesive as prepared in Example 2-1 was applied to a PET film having a thickness of 25 μm as a base material, and then dried to obtain a pressure-sensitive adhesive sheet having a polyester-based pressure-sensitive adhesive layer having a thickness of 5 μm. A waterstop sealing material was then prepared in the same manner as in Example 2-1 except that the pressure-sensitive adhesive sheet thus obtained was used.

EXAMPLE 2-3

The foregoing ingredients were kneaded by a mixing roll, heated to a temperature of 160° C. for 30 minutes in an oven so that they were vulcanized and expanded, withdrawn from the oven, allowed to cool, and then compressed so that some of cells were ruptured to obtain a closed foamed structure. The resulting foamed structure had a specific gravity of 0.10 g/ml. A waterstop sealing material was prepared in the same manner as in Example 2-1 except that the closed foamed structure was used instead of the semi-closed and semi-open foamed structure of Example 2-1.

Formulation of Foamed Structure

| | |
|---|---|
| Ethylene-propylene terpolymer* | 40 parts |
| Butyl rubber | 60 parts |
| Zinc oxide | 5 parts |
| Stearic acid | 3 parts |
| Carbon | 50 parts |
| Heavy calcium carbonate | 50 parts |
| Process oil | 20 parts |
| Sulfur | 0.5 parts |
| Mercaptobenzothiazole | 1 part |
| Zinc diethyldithiocarbaminate | 1 part |
| Quinone dioxim | 0.5 parts |
| Quinone monoxim | 0.5 parts |
| Azodicarboxylic acid amide | 20 parts |

*a terpolymer prepared from ethylene, propylene and 5-ethylidene-2-norbornene

The various waterstop sealing materials of the foregoing examples were each then subjected to waterstop test, including U-shaped waterstop test and high pressure running water stop test, according to the following methods. The results of these tests are set forth in Tables 1 and 2 below.

U-Shaped Waterstop Test

Figure 1:
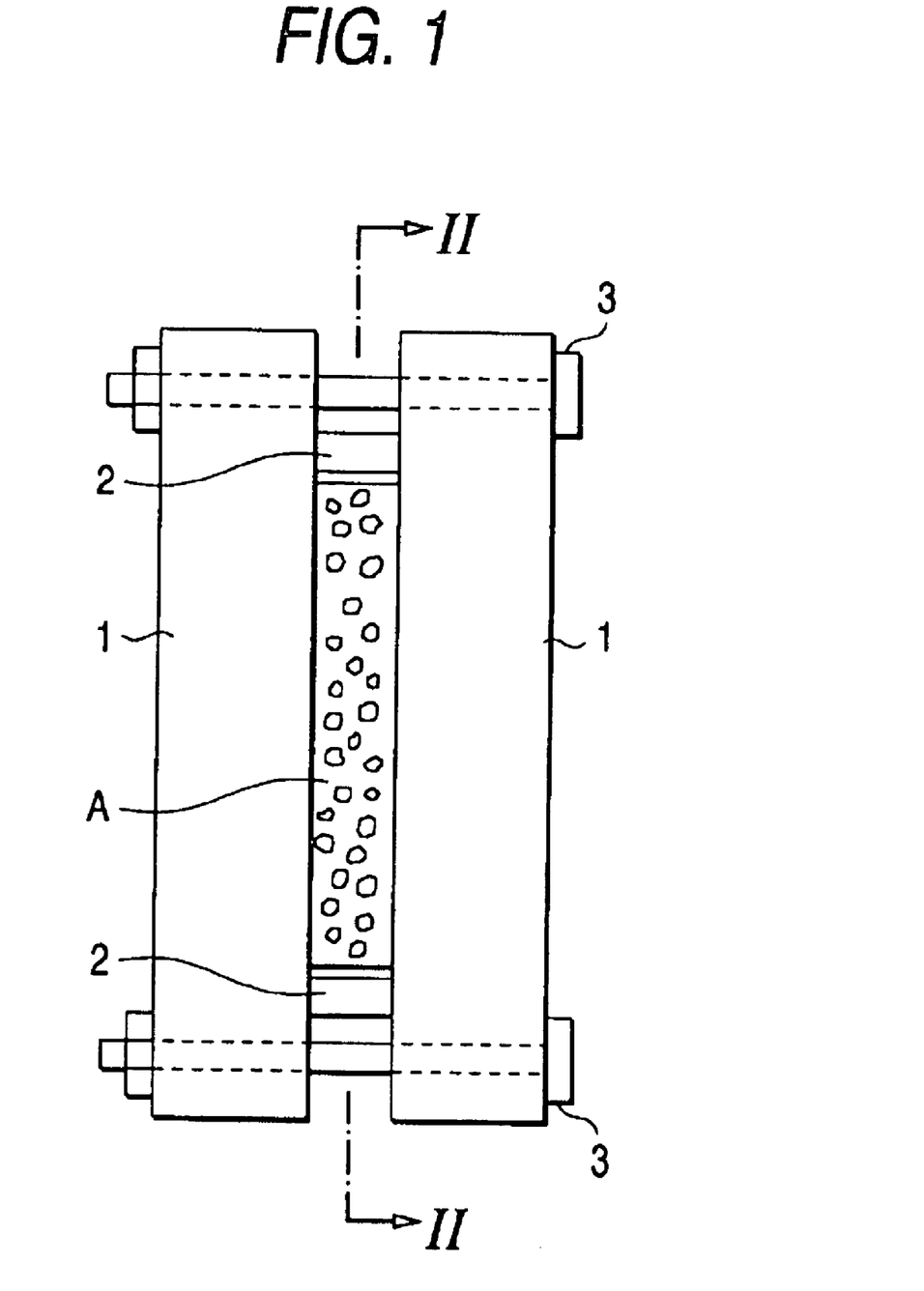
FIG. 1 is a side view illustrating the structure of an apparatus for subjecting waterstop sealing material to U-shaped waterstop test.
Figure 2:
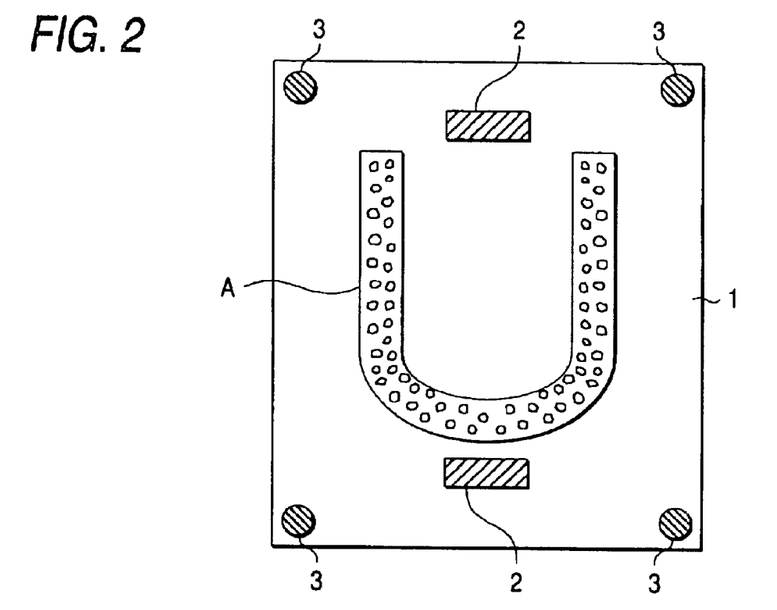
FIG. 2 is a sectional view taken on line II—II of FIG. 1.

The waterstop sealing material was worked into string having a square section of 10 mm×10 mm to give Sample A. Sample A was bent in U shape, and then clamped by two sheets of acryl plates 1, 1 which were then fastened by a bolt and nut 3 with a space being kept by a spacer 2. The compressibility of Sample A was adjusted by changing the thickness of the spacer 2 with respect to the thickness of the string of Sample A.

Figure 3:
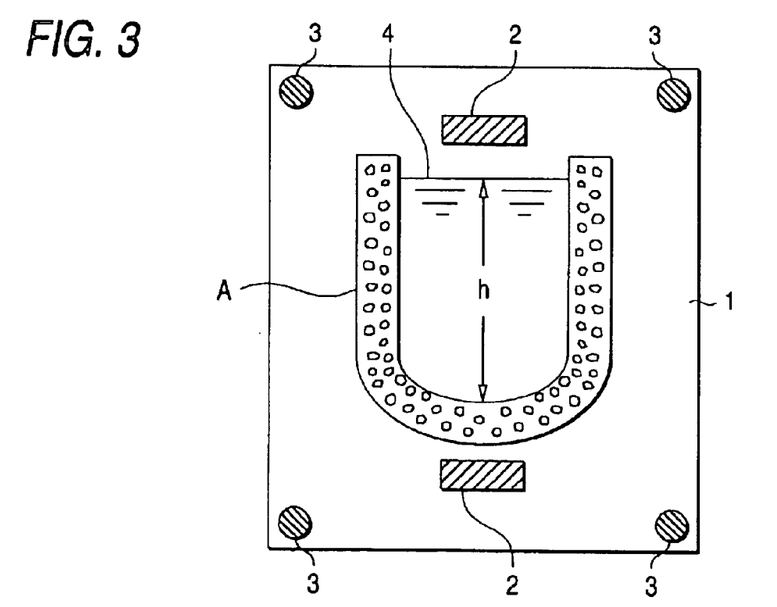
FIG. 3 is a sectional view illustrating the apparatus of FIGS. 1 and 2 shown having water contained in the U-shaped sample (waterstop sealing material)

After fastening by the bold and nut 3, water 4 was then poured into the U-shape portion of Sample A to a head of 100 mm as shown in FIG. 3. Separately, Sample A thus fastened was allowed to stand in a 80° C. atmosphere for 168 hours, and then returned to room temperature. Water 4 was then similarly poured into the U-shaped portion of Sample A to a head of 100 mm. The above prepared samples, namely, the former samples immediately after mounted and the latter samples after 168 hours of 80° C. aging, were subjected to a U-shaped waterstop test to determine the compressibility of Sample A (with respect to the direction of the thickness of the string) at which water can be stopped.

High Pressure Running Waterstop Test

Figure 4:
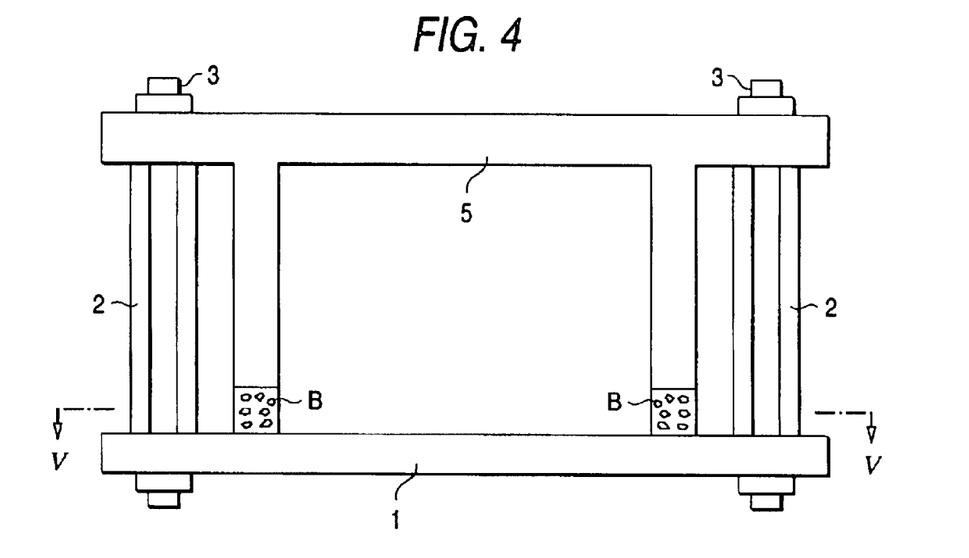
FIG. 4 is a side view illustrating the structure of an apparatus for subjecting waterstop sealing material to high pressure running waterstop test.
Figure 5:
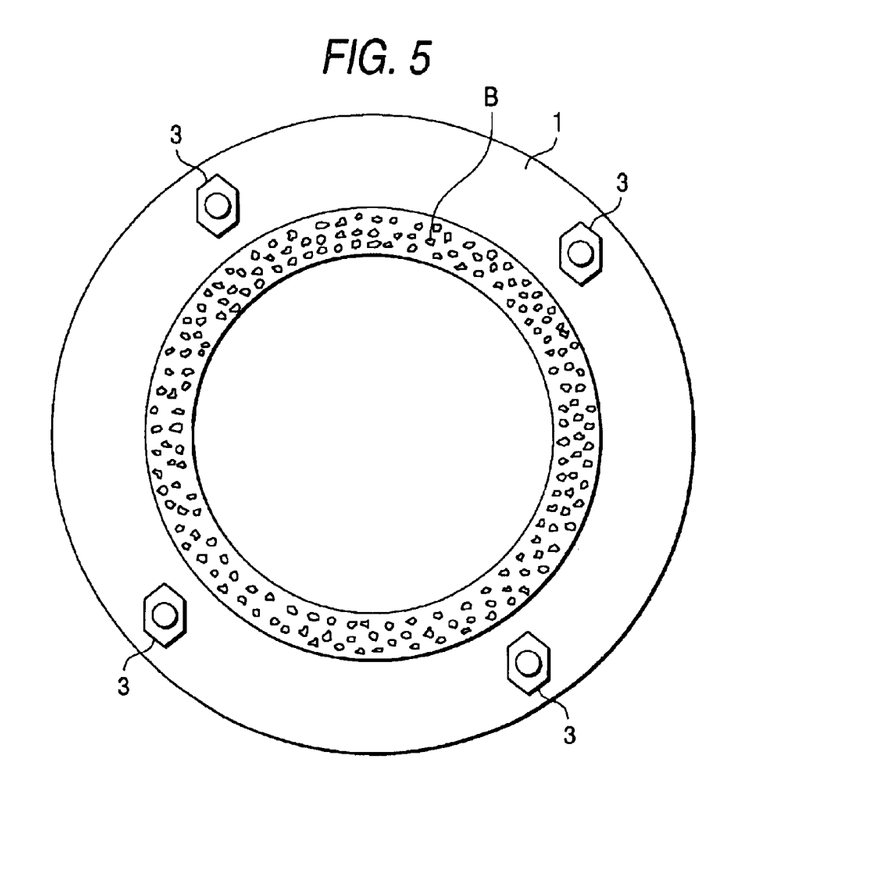
FIG. 5 is a sectional view taken on line V—V of FIG. 4, wherein the symbols A and B each indicate a sample (waterstop sealing material), the reference numeral 1 indicates an acryl plate, the reference numeral 2 indicates a spacer, the reference numeral 3 indicates a bolt and nut; the reference numeral 4 indicates water, and the reference numeral 5 indicates an acryl molded product.

The waterstop sealing material was worked into donut having a thickness of 10 mm, an outer diameter of 100 mm and an inner diameter of 80 mm to obtain Sample B. Sample B was then clamped by an acryl plate 1 and an acryl molded product 5 and fastened by a bolt and nut 3 with a space being kept by a spacer 2 through which the bolt pierces. The compressibility of Sample B was properly adjusted by changing the thickness of the spacer 2 with respect to the direction of the thickness of Sample B. After fastened by the bolt and nut 3, Sample B, the waterstop sealing material portion, was hit by water for 3 minutes in the direction perpendicular to the thickness direction of Sample B at a pressure of 80 kgf/cm$^2$ from a distance of 300 mm. Then, the compressibility of Sample B at which water can be stopped was determined.

TABLE 1

U-Shaped Waterstop Test

| Example No. | After mounted | After 168 hours of 80° C. aging | High Pressure Running Waterstop Test |
|---|---|---|---|
| 1-1 | Water stopped at compressibility of 10% | Water stopped at compressibility of 10% | Water leaked at a compressibility of 50% Water stopped at compressibility of 60% |
| 1-2 | Water stopped at compressibility of 10% | Water stopped at compressibility of 10% | Water leaked at a compressibility of 50% Water stopped at compressibility of 60% |
| 1-3 | Water stopped at compressibility of 10% | Water stopped at compressibility of 10% | Water stopped at compressibility of 10% |

TABLE 2

| Example No. | U-Shaped Waterstop Test | | High Pressure Running Waterstop Test |
|---|---|---|---|
| | After mounted | After 168 hours of 80° C. aging | |
| 2-1 | Water stopped at compressibility of 10% | Water stopped at compressibility of 10% | Water leaked at a compressibility of 50% Water stopped at compressibility of 60% |
| 2-2 | Water stopped at compressibility of 10% | Water stopped at compressibility of 10% | Water leaked at a compressibility of 50% Water stopped at compressibility of 60% |
| 2-3 | Water stopped at compressibility of 10% | Water stopped at compressibility of 10% | Water stopped at compressibility of 10% |

As can be seen in the results of Tables 1 and 2, all the waterstop sealing materials of Examples 1—1 to 1-3 and 2-1 to 2-3 of the present invention exhibit good waterstop properties when the foamed structure exhibits a low compressibility and do not lower its water stopping action even when the repulsive stress is relaxed with time. These waterstop sealing materials also exhibit high waterstop properties with respect to high pressure running water.

The conventional waterstop sealing materials comprising an acrylic pressure-sensitive adhesive layer provided on one side of the foamed structure can leak water at a higher compressibility than above, even at a compressibility of 90% in the U-shaped waterstop test (after 168 hours of 80° C. aging), showing deteriorated sealing properties. The conventional waterstop sealing materials comprising an acrylic pressure-sensitive adhesive layer provided on both sides of the foamed structure exhibit good sealing properties (water was stopped at a compressibility of from 10 to 20%) but can hardly be repositioned due to the surface tackiness, frequently causing troubles in sealing operation. On the contrary, the various waterstop sealing materials according to the present invention comprise a tack-free polyester-based pressure-sensitive adhesive layer and thus cause no such troubles, facilitating mounting operation.

COMPARATIVES EXAMPLES

Waterstop sealing materials were prepared in the same manner as in Examples 1—1 and 1-3 except that the two-layer pressure-sensitive adhesive layer was replaced by a single-layer structure comprising the upper layer (polyester-based pressure-sensitive adhesive layer having a thickness of 30 μm) dispense with the subbing layer (acrylic pressure-sensitive adhesive layer having a thickness of 50 μm). These waterstop sealing materials were then examined for properties. As a result, the waterstop sealing material comprising a closed foamed structure corresponding to Example 1-3 showed water leakage at a compressibility of 30% and waterstop at a compressibility of 40% and thus was inferior to those according to the invention.

The waterstop sealing materials were also subjected to U-shaped waterstop test under severer conditions than 80° C.×168 hour. Namely, the sample fastened by the bolt and nut 3 was allowed to stand in a 80° C. atmosphere for 60 days, and then subjected to U-shaped waterstop test in the same manner as mentioned above. As a result, the waterstop sealing material having the foregoing single-layer structure and the semi-closed and semi-open foamed structure corresponding to Example 1—1 could stop water at a compressibility of 50%, and the waterstop sealing material having the foregoing single-layer structure and the closed foamed structure corresponding to Example 1-3 could stop water at a compressibility of 30%. On the contrary, all the waterstop sealing materials of Examples 1—1 and 1-3 could sufficiently stop water at a compressibility of 10%, demonstrating that the waterstop sealing materials of the invention exhibit drastically enhanced waterstop properties as compared with those having the foregoing single-layer structure.

Reference waterstop sealing materials were prepared in the same manner as in Examples 2-1 and 2-3 except that the pressure-sensitive adhesive sheet (and an acrylic pressure-sensitive adhesive layer having a thickness of 50 μm on the inner side thereof) was replaced by a polyester-based pressure-sensitive adhesive layer having a thickness of 30 μm. These reference waterstop sealing materials were then examined for properties. As a result, the reference waterstop sealing material comprising a closed foamed structure corresponding to Example 2-3 showed water leakage at a compressibility of 30% and waterstop at a compressibility of 40% and thus was inferior to those according to the invention.

The waterstop sealing materials were also subjected to waterstop test under severer conditions 80° C.×168 hour U-shaped waterstop test. In some detail, the sample fastened by the bolt and nut 3 was allowed to stand in a 80° C. atmosphere for 60 days, and then subjected to U-shaped waterstop test in the same manner as mentioned above. As a result, the waterstop sealing material comprising the semi-closed and semi-open foamed structure corresponding to Example 2-1 could stop water at a compressibility of 50%, and the waterstop sealing material comprising the closed foamed structure corresponding to Example 2-3 could stop water at a compressibility of 30%. On the contrary, all the waterstop sealing materials of Examples 2-1 and 2-3 could sufficiently stop water at a compressibility of 10%, demonstrating that the waterstop sealing materials of the invention exhibit drastically enhanced waterstop properties as compared with the foregoing reference waterstop sealing materials.

As mentioned above, in accordance with the present invention, a multi-layer pressure-sensitive adhesive layer the outermost layer of which is made of a specific pressure-sensitive adhesive composition mainly composed of a polymer having a polycarbonate structure is provided on a foamed structure having closed cells or both closed cells and open cells. Accordingly, a waterstop sealing material can be obtained which can be easily mounted because of tack-freeness on the outermost layer and can be gradually bonded to the adherend by the repulsive power of the foamed structure to exhibit excellent sealing properties between the surface of the foamed structure and the interface of the adherend. In particular, the subbing pressure-sensitive adhesive layer can inhibit the migration of components from the foamed structure, making it possible to avoid the deterioration of the outermost pressure-sensitive adhesive layer. Thus, the waterstop sealing material of the invention can exhibit high sealing properties under severe conditions such as high temperature over an extended period of time. Further, the waterstop sealing materials comprising the foregoing multi-layer pressure-sensitive adhesive layer provided on one side of the foamed structure and a pressure-sensitive adhesive layer made of a general-purpose rubber pressure-sensitive adhesive or acrylic pressure-sensitive adhesive provided on the other side of the foamed structure can make the use of characteristics inherent to the foregoing general-purpose pressure-sensitive adhesives without losing the foregoing advantages.

Further, in accordance with the present invention, a layer made of a specific pressure-sensitive adhesive composition mainly composed of a polymer having a polycarbonate structure is provided on the foamed structure having closed cells or both closed cells and open cells. In this arrangement, a waterstop sealing material having excellent sealing operation and excellent sealing properties between the surface of the foamed structure and the interface of the adherend can be obtained which can exhibit high sealing properties even under severe conditions such as high temperature over an extended period of time. Moreover, a layer made of the foregoing pressure-sensitive adhesive composition is provided on one side of the foamed structure through a base material while a pressure-sensitive adhesive layer made of a general-purpose rubber or acrylic pressure-sensitive adhesive is provided on the other side of the foamed structure. In this arrangement, a waterstop sealing material can be provided which can make the use of the characteristics of the foregoing general-purpose pressure-sensitive adhesive layer without losing the foregoing advantages.

While the invention has been described in detail and with reference to specific embodiments thereof, it will be apparent to one skilled in the art that various changes and modifications can be made therein without departing from the spirit and scope thereof.

What is claimed is:

1. A water stop sealing material comprising a foamed structure having closed cells or both closed cells and open cells, said foamed structure having two opposing surfaces, and a multi-layer pressure-sensitive adhesive layer provided on the first of said opposing surfaces, said multi-layer pressure-sensitive adhesive layer comprising an inner subbing pressure-sensitive layer comprising rubber or acrylic pressure-sensitive adhesive and an outermost layer comprising a pressure-sensitive adhesive composition containing a polymer having a polycarbonate structure having a repeating unit represented by the following general formula:

wherein R represents a $C_{2-20}$ straight-chain or branched hydrocarbon group and n represents a positive integer, wherein the inner subbing pressure-sensitive layer and the outermost layer have different compositions.

2. The waterstop sealing material according to claim 1, wherein said foamed structure has on the second opposing surface a pressure-sensitive adhesive layer comprising a pressure-sensitive adhesive composition different from said pressure-sensitive adhesive composition of said outermost layer.

3. The waterstop sealing material according to claim 2, wherein the pressure-sensitive adhesive layer provided on the second opposing surface comprises a rubber pressure-sensitive adhesive or an acrylic pressure-sensitive adhesive.

4. The waterstop sealing material according to claim 1, wherein the polymer having a polycarbonate structure has a weight-average molecular weight of from 10,000 to 300,000.

5. The waterstop sealing matterial according to claim 1, wherein the polymer having a polycarbonate structure is selected from the group consisting of a polyester synthesized from polycarbonate diol or a derivative thereof and dicarboxylic acid, a polyester synthesized from polycarbonate-dicarboxylic acid and diol, and a polyurethane synthesized from polycarbonate diol and diisocyanate.

* * * * *